(12) United States Patent
Kim

(10) Patent No.: US 8,178,236 B2
(45) Date of Patent: May 15, 2012

(54) SECONDARY BATTERY INCLUDING AN INSULATION CASE WITH AN INSERTION GROOVE

(75) Inventor: Sunjae Kim, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 762 days.

(21) Appl. No.: 12/263,600

(22) Filed: Nov. 3, 2008

(65) Prior Publication Data

US 2009/0130550 A1  May 21, 2009

(51) Int. Cl.
*H01M 2/02* (2006.01)
(52) U.S. Cl. ............ 429/178; 429/179; 429/7; 429/175; 429/185
(58) Field of Classification Search .................. 429/163, 429/175, 176, 178, 179, 185, 186, 7; 174/260
See application file for complete search history.

(56) References Cited

U.S. PATENT DOCUMENTS

2007/0026302 A1   2/2007   Yoon

FOREIGN PATENT DOCUMENTS

| CN | 1385908 | | 12/2002 |
| JP | 2007-035638 | A | 2/2007 |
| JP | 2007-035638 | * | 8/2007 |
| KR | 20-1999-0026661 | A | 7/1999 |
| KR | 1999-0026661 | | 7/1999 |
| KR | 20-0406606 | Y1 | 1/2006 |
| KR | 10-0624966 | | 9/2006 |
| KR | 10-2006-0123012 | A | 12/2006 |
| KR | 10-0659864 | | 12/2006 |

* cited by examiner

*Primary Examiner* — Raymond Alejandro
(74) *Attorney, Agent, or Firm* — Knobbe Martens Olson & Bear LLP

(57) ABSTRACT

A secondary battery includes: a bare cell; an insulation case located on the bare cell; a protection device seated on the insulation case and electrically coupled to the bare cell; and a first lead electrically coupled to a first terminal of the protection device, where the insulation case includes; a base portion on which the protection device is seated; an anchor portion provided on a surface at one end of the base portion; and a hook portion projecting from one side surface of the anchor portion toward a center of the base portion and having an insertion groove at a lower portion thereof. The first lead is connected to the hook portion of the insulation case.

16 Claims, 8 Drawing Sheets

[FIG. 1]
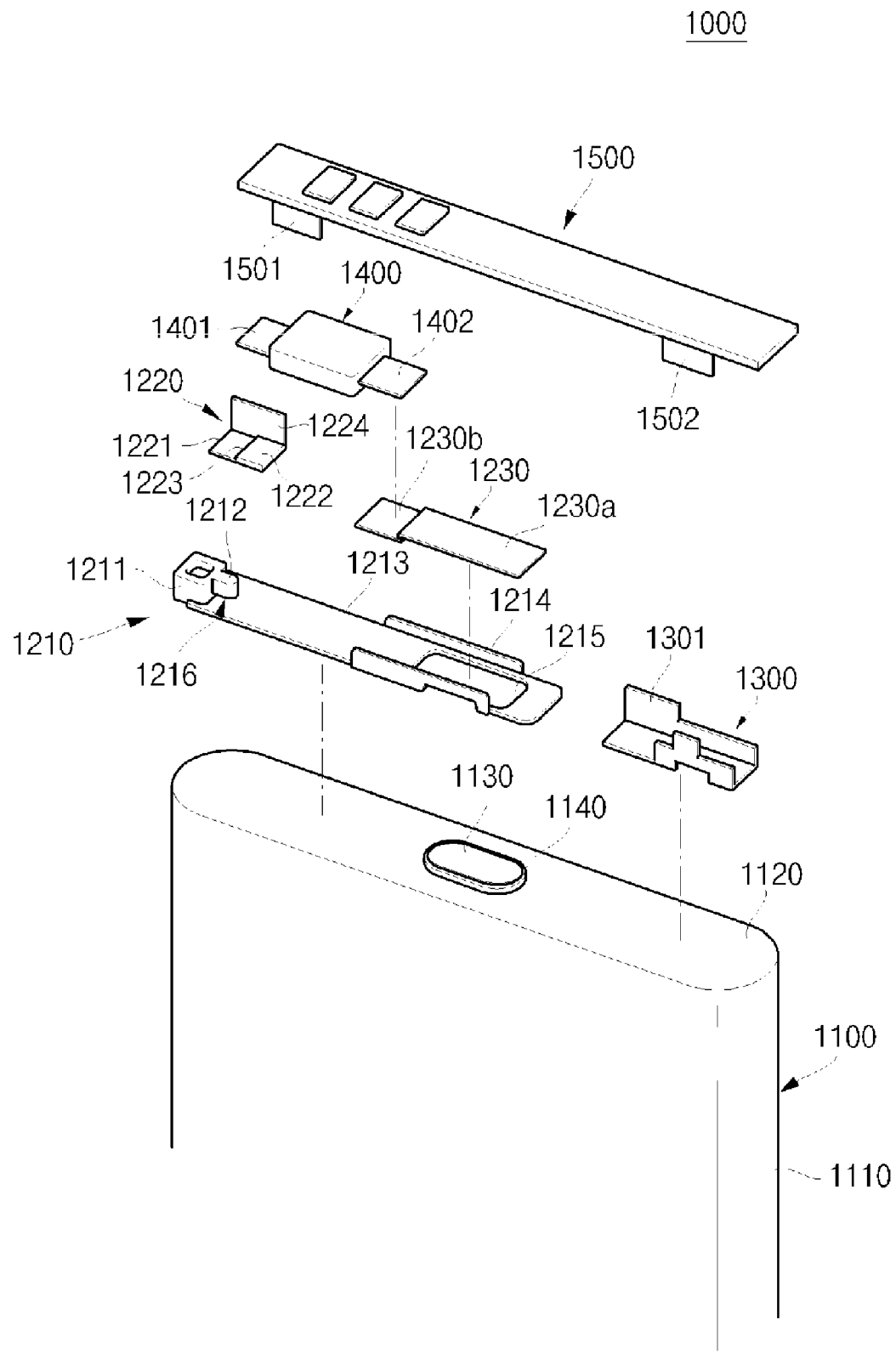

[FIG. 2]
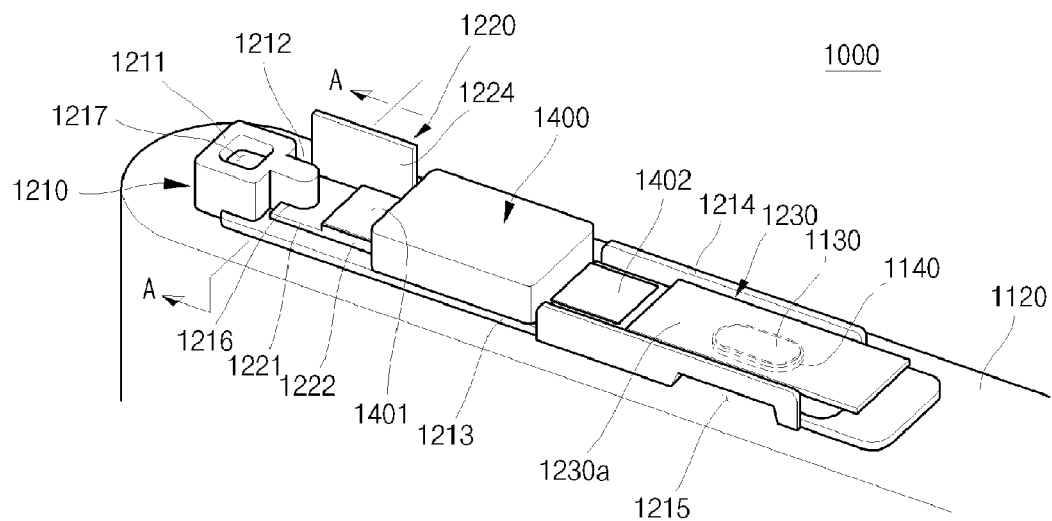
[FIG. 3]
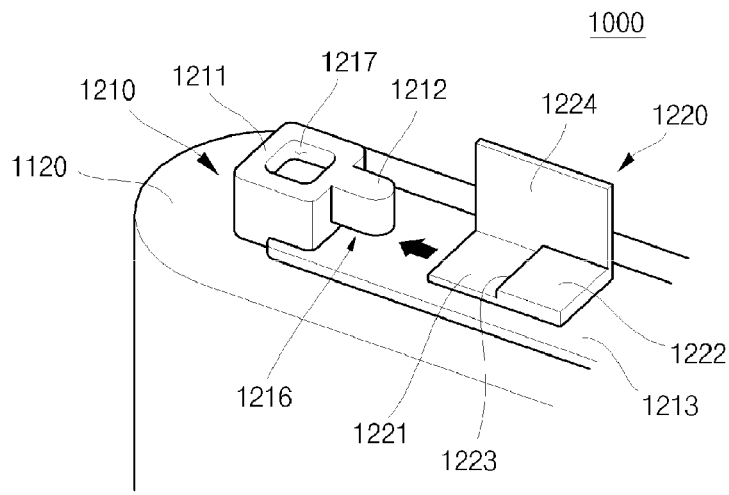

[FIG. 4]
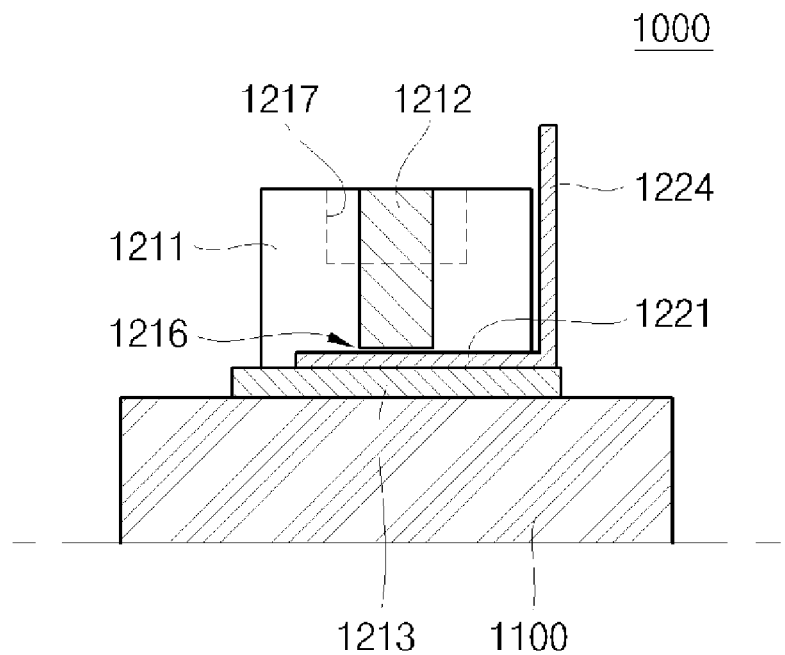
[FIG. 5]
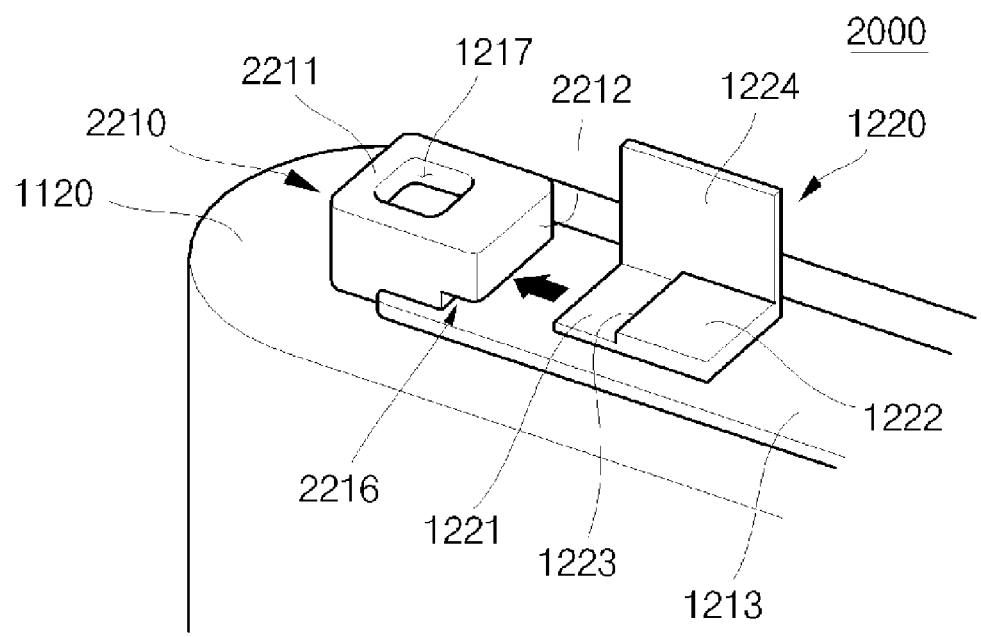

[FIG. 6]
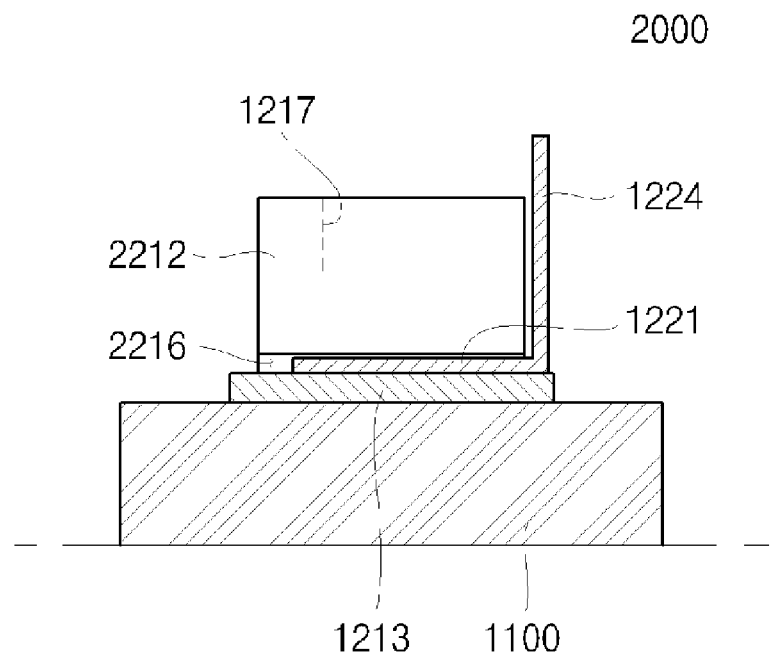
[FIG. 7]
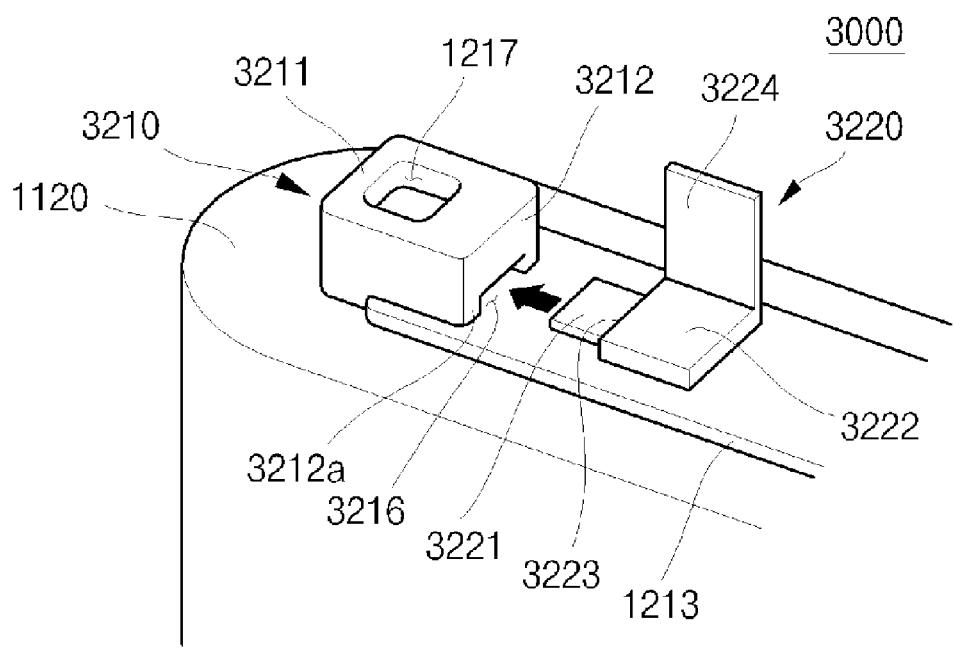

【FIG. 8】
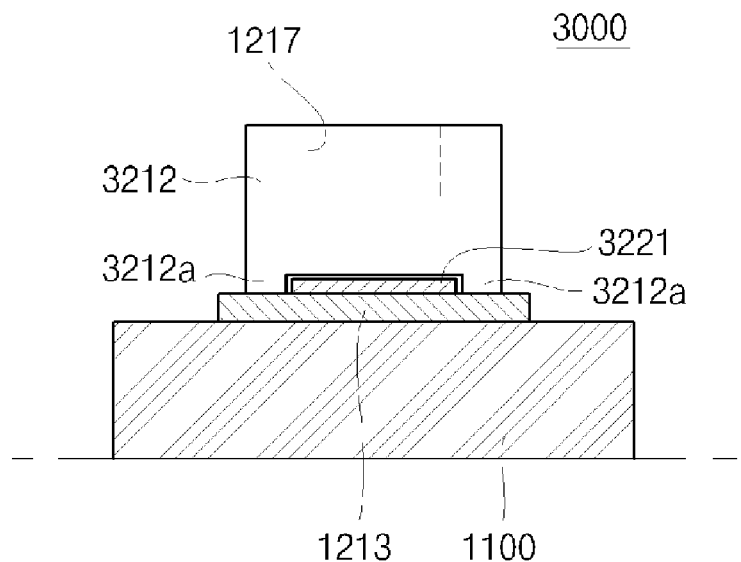
【FIG. 9】
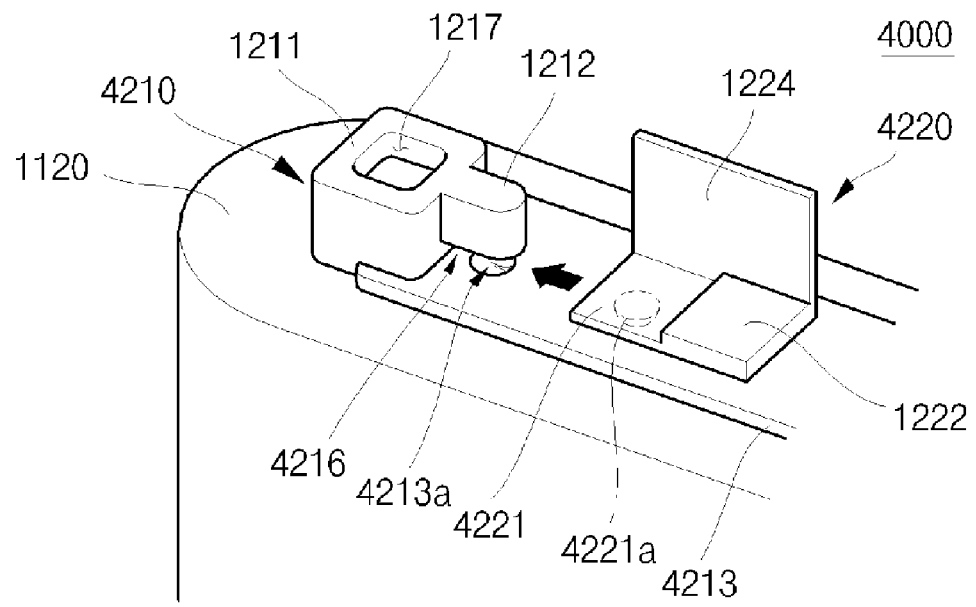

[FIG. 10]
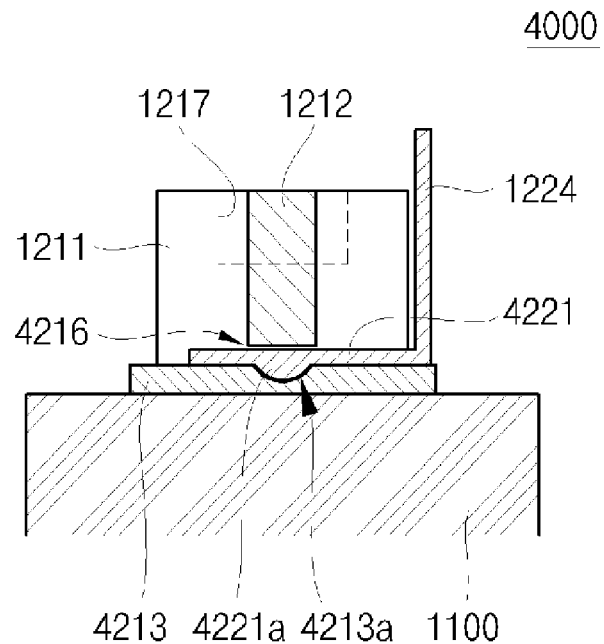
[FIG. 11]
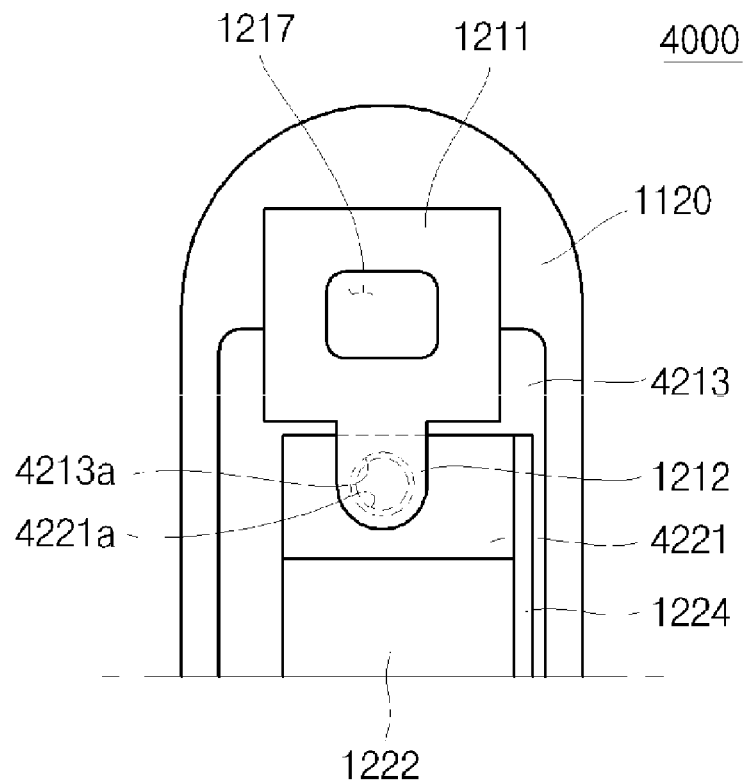

[FIG. 12]
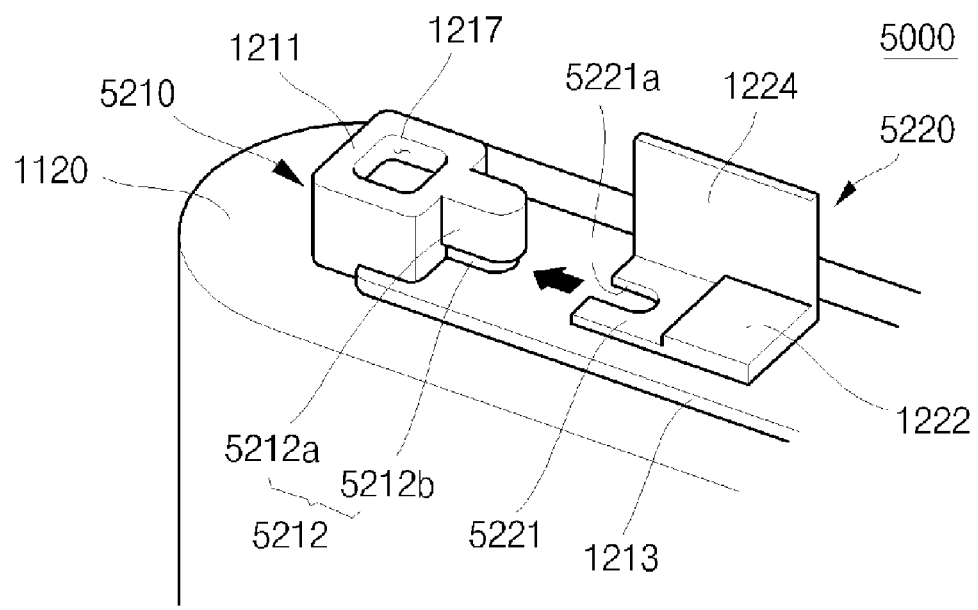
[FIG. 13]
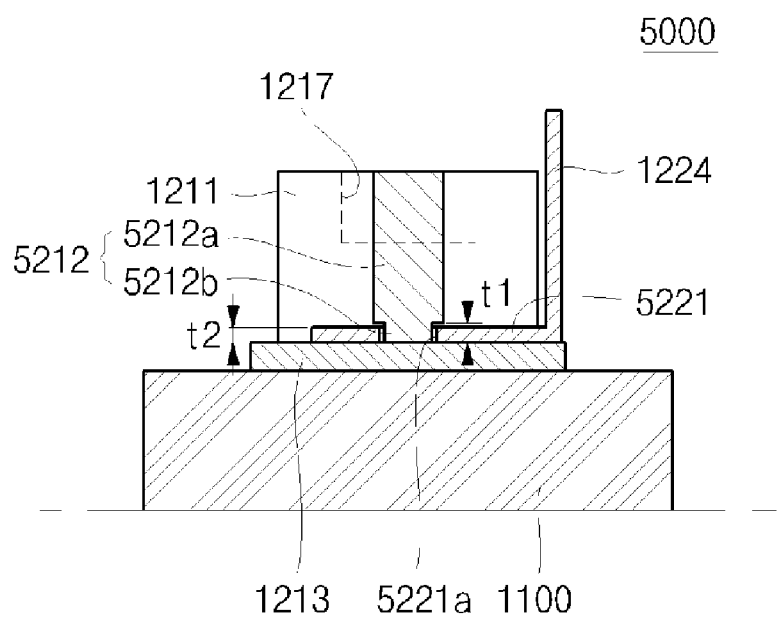

[FIG. 14]
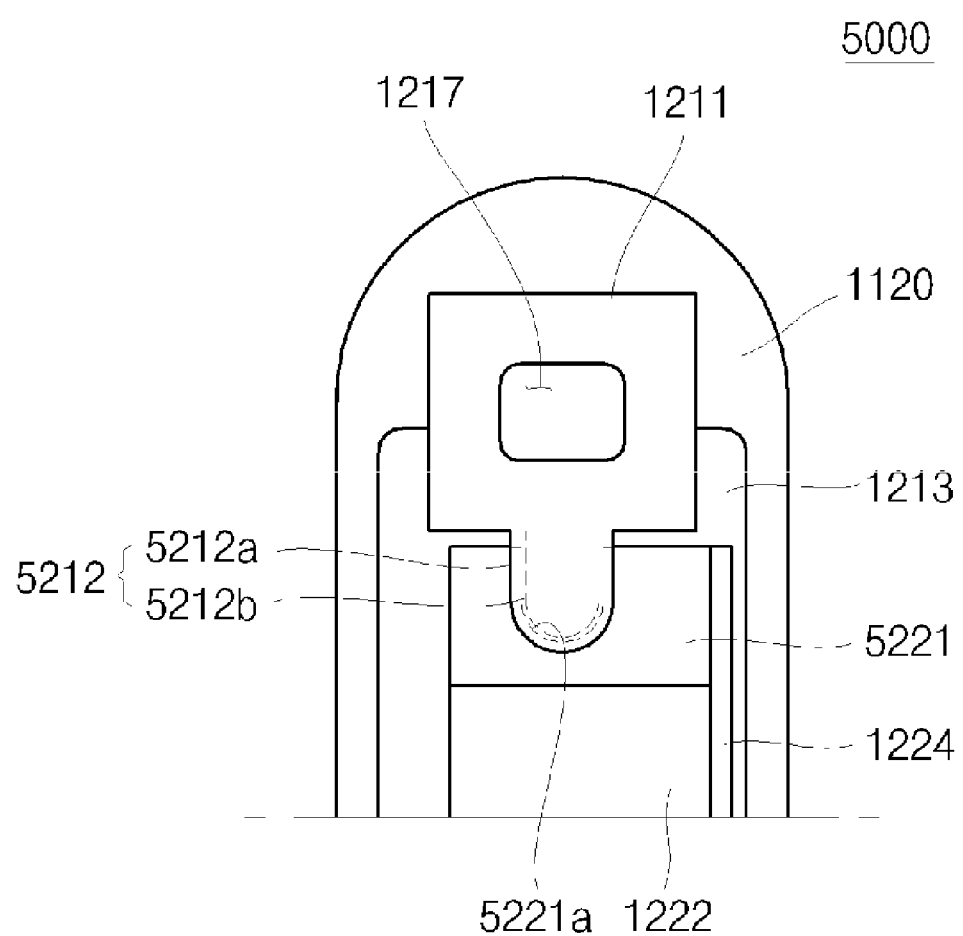

SECONDARY BATTERY INCLUDING AN INSULATION CASE WITH AN INSERTION GROOVE

CROSS-REFERENCE TO RELATED APPLICATIONS

This application claims the benefit of Korean Application No. 2007-116478, filed Nov. 15, 2007, in the Korean Intellectual Property Office, the disclosure of which is incorporated herein by reference.

BACKGROUND OF THE INVENTION

1. Field of the Invention

Aspects of the present invention relate to a secondary battery, and more particularly, to a secondary battery that can combine a protection device with an insulation case by mechanical connection.

2. Description of the Related Art

Generally, a batteries used as a power source of electronic devices have become more important and have been actively developed with increased use of portable electronic devices such as cellular phones and portable personal digital assistants (PDAs) and digital cameras, etc. with the reduction in size of electric bicycles, electric cars and electric tools.

A lithium secondary battery has an operating voltage of 3.6V, which is three times more than that of a nickel-cadmium battery or a nickel-hydrogen battery that are usually used as a power source of electronic devices. In addition, the lithium secondary battery has higher energy density per unit weight. Accordingly, the lithium secondary battery has been widely used in the portable wireless devices as well as in various technology fields.

The lithium secondary battery typically includes a bare cell, a protection circuit board and a molded part or a case covering a portion where the bare cell and the protection circuit are electrically coupled to each other. The electrical coupling between the bare cell and the protection circuit is typically formed by using a conduction device called a lead plate, a protection device such as a thermal breaker or a bimetal, and an insulation sheet. Accordingly, the bare cell and the protection circuit board are electrically coupled to each other by welding separate connection members or elements to the bare cell or the protection circuit board, or welding them to each other. Particularly, the protection device is typically attached to the insulation case by using a double sided tape for preventing the protection device from being released from the insulation case. However, when the protection device is attached to the insulation case by the double sided tape, relatively precise and troublesome works are required and defect products are increased and productivity of the battery is reduced because of defects of electrical coupling of the battery. In addition, the attachment by the double sided tape is weak to external forces such as torsion or bending, thereby lowering safety.

SUMMARY OF THE INVENTION

Accordingly, a protection device is prevented from being separated from an insulation case of a secondary battery by fixing the protection device to an insertion groove located in the insulation case by way of a first lead when the protection device is connected to the insulation case.

Moreover, defects of a secondary battery may be prevented and productivity in manufacturing the battery may be improved connecting the protection device to the insulation case by an assembling type connection method without using a double sided tape.

Moreover, durability of the connection between the protection device and the insulation case with respect to external forces such as torsion or bending may be improved.

Additional and/or other advantages, objects and features of the invention will be set forth in part in the description which follows and in part will become apparent to those having ordinary skill in the art upon examination of the following or may be learned from practice of the invention.

According to an embodiment of the present invention, there is provided a secondary battery, which includes: a bare cell; an insulation case located on the bare cell; a protection device seated on the insulation case and electrically coupled to the bare cell; and a first lead electrically coupled to a first terminal of the protection device, wherein the insulation case includes: a base portion on which the protection device is seated; an anchor portion provided on a surface including one end of the base portion; and a hook portion projecting from one side surface of the anchor portion toward a center of the base portion and having an insertion groove at a lower part thereof, wherein the first lead is connected to the hook portion of the insulation case.

According to an aspect of the present invention, the first lead may be electrically coupled to a protection circuit board.

According to an aspect of the present invention, the first lead may include a horizontal portion and a vertical portion bent in the direction perpendicular to the horizontal portion, and the horizontal portion may include a welding portion electrically coupled to the first terminal of the protection device and an insertion portion that is inserted into the insertion groove of the insulation case.

According to an aspect of the present invention, a step height may be formed between the welding portion and the insertion portion.

According to an aspect of the present invention, the height of the insertion groove may correspond to a thickness of the insertion portion of the first lead.

According to an aspect of the present invention, the insulating case including the base portion, anchor portion and hook portion may be an integrally molded resin article.

According to an aspect of the present invention, the width of the hook portion may be narrower than the width of the one side surface of the anchor portion.

According to an aspect of the present invention, the width of the hook portion may be the same as the width of the one side surface of the anchor portion.

According to an aspect of the present invention, support side walls may extend from opposing lower side surfaces of the hook portion so as to contact an upper surface of the base portion such that a rectangular insertion groove is formed between the lower surface of the hook portion and the upper surface of the base portion.

According to an aspect of the present invention, the insertion part of the first lead may be inserted into the insertion groove, and the thickness and width of the insertion portion may respectively correspond to the height and width of the insertion groove.

According to an aspect of the present invention, a base portion indentation may be formed in a region of the base portion juxtaposed to the hook portion, a projecting portion corresponding to the base indentation may be formed on a lower surface of the first lead. A sectional surface of the base indentation may have a circular, oval or round rectangular shape.

According to another embodiment of the present invention, there is provided a secondary battery, which includes: a bare cell; an insulation case located on the bare cell; a protection device seated on the insulation case; and a first lead electrically coupled to a first terminal of the protection device, where the insulation case includes; a base portion on which the protection device is seated; an anchor portion provided on a surface including one end of the base portion; and a projection portion projected from one side surface of the anchor portion toward a center of the base portion, wherein the projection portion includes a first projection portion extending from an upper surface of the projection portion and a second projection portion formed under the first projection portion so as to have a step height with the first projection portion, and wherein the first lead is connected to the projection portion of the insulation case.

According to an aspect of the present invention, the first lead may be electrically coupled to a protection circuit board.

According to an aspect of the present invention, the first lead may include a horizontal portion and a vertical portion bent in a direction perpendicular to the horizontal portion, and the horizontal portion may include a welding portion electrically coupled to the first terminal of the protection device and an insertion portion inserted into the insertion groove of the insulation case.

According to an aspect of the present invention, a thickness of the insertion portion of the first lead may correspond to height of the second projection portion, an insertion groove corresponding to a projected height of the second projection portion may be formed at the insertion portion of the first lead, and the second projection portion may be inserted into and surrounded by the insertion groove.

According to another embodiment of the present invention, there is provided a secondary battery, comprising: a bare cell; an insulation case located on the bare cell; a protection device seated on the insulation case and electrically coupled to the bare cell; and a first lead physically and electrically coupled to a first terminal of the protection device, wherein the insulation case comprises; a base portion on which the protection device is seated; and a lead-engaging portion that extends from the base portion to engage the first lead such that the protection device is immobilized in at least one direction on the base portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will be apparent and more readily appreciated from the following description of the embodiments, taken in conjunction with the accompanying drawings of which:

FIG. 1 is an exploded perspective view illustrating a secondary battery according to an embodiment of the present invention;

FIG. 2 is a perspective view illustrating a state in which an insulation case and a protection device of the secondary battery are combined with each other;

FIG. 3 is a perspective view illustrating the relationship of the insulation case and the first lead of the secondary battery according to an embodiment of the present invention;

FIG. 4 is a sectional view taken along an 'A-A' line of FIG. 2;

FIG. 5 is a perspective view illustrating the relationship of the insulation case and the first lead of a secondary battery according to another embodiment of the present invention;

FIG. 6 is a sectional view illustrating the secondary battery of FIG. 5 as assembled;

FIG. 7 is a perspective view illustrating the relationship of the insulation case and the first lead of a secondary battery according to a still another embodiment of the present invention;

FIG. 8 is a sectional view illustrating the secondary battery of FIG. 7 as assembled;

FIG. 9 is a perspective view illustrating the relationship of the insulation case and the first lead of a secondary battery according to a still another embodiment of the present invention;

FIG. 10 is a sectional view illustrating the secondary battery of FIG. 9 as assembled;

FIG. 11 is a plan view of the secondary battery of FIG. 9;

FIG. 12 is a perspective view illustrating the relationship of the insulation case and the first lead of a secondary battery according to still another embodiment of the present invention;

FIG. 13 is a sectional view illustrating the secondary battery of FIG. 12 as assembled; and FIG. 14 is a plan view of the secondary battery of FIG. 12.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is an exploded perspective view illustrating a secondary battery according to an embodiment of the present invention, FIG. 2 is a perspective view illustrating a state in which an insulation case and a protection device of the secondary battery are combined with each other, FIG. 3 is a perspective view illustrating a relationship of the insulation case and a first lead, and FIG. 4 is a sectional view taken along an 'A-A' line of FIG. 2.

Referring to the drawings, the secondary battery 1000 includes a bare cell 1100 including an electrode terminal 1130 that is protrudes from one side of the bare cell 1100, an insulation case 1210 located on the bare cell 1100, a protection device 1400 seated on the insulation case 1210 and a first lead 1220 electrically coupled to the protection device 1400.

The secondary battery 1000 may additionally include a second lead 1230, a third lead 1300 and a protection circuit board 1500 as shown, for example, in FIG. 1.

The bare cell is rechargeable and may a typical bare cell used in a secondary battery. The bare cell 1100 includes a rechargeable electrode assembly, a can 1110 having one open side and receiving the electrode assembly through the open side and a cap assembly sealing the open side of the can 1110. An electrolytic solution is injected into the can 1110. The electrode assembly includes a cathode plate formed by coating a cathode active material on a metallic cathode base material, an anode plate formed by coating an anode active material on a metallic anode base material and a separator interposed between the cathode and anode plates. The cathode and anode plates, and the separator are stacked and wound altogether in a roll type. Electrode tabs are connected to the cathode and anode plates respectively. A cathode tab connected to the cathode plate is electrically coupled to a cap plate 1120 of a cap assembly, and an anode tab connected to the anode plate is electrically coupled to an electrode terminal 1130 that is insulated from the cap plate. Accordingly, the can 1110 and cap plate 1120 of the bare cell 1100 form a cathode terminal, and the electrode terminal 1130 forms an anode terminal. An insulation gasket 1140 may be inserted between the cap plate 1120 and the electrode terminal 1130 so that the cap plate 1120 and the electrode terminal 1130 are electrically separated from each other by the insulation gasket 1140. It is to be understood that the bare cell is not limited to what is described above, and other structures may be used.

As used herein, the terms such as "upper," "vertical," "height," "higher," and "lower" may be interpreted from the perspective of a secondary battery 1000 having an electrode terminal 1130 and a cap plate 1120 at a surface of the secondary battery 1000, such as a top surface. In this context, the term "lower" refers to being in a direction toward the surface of the secondary battery 1000 and the terms "upper" and "higher" refer to being in a direction away from the surface of the secondary battery. Similarly, the term "height" refers to a distance in the direction away from the surface of the battery and the term "vertical" refers to a direction toward and away from the battery, perpendicular to the surface of the battery. The term "width refers to a distance in a direction parallel to the surface of the secondary battery, generally in a direction across the lesser dimension of the surface of the secondary battery. Moreover, unless otherwise indicated, it is to be understood that terms such as "formed on," "coupled to" or "attached to" are used to describe a structure and are not to be limiting as to any particular method of manufacturing.

The insulation case 1210 includes an anchor portion 1211, a hook portion 1212 having an insertion groove 1216 at a lower part thereof, and a base portion 1213 provided with the anchor portion 1211 and hook portion 1212.

The insulation case 1210 may further include a side wall 1214 and a through hole 1215 through which the electrode terminal 1130 extends, as shown in FIG. 1.

The anchor portion 1211 of the insulation case 1210 is formed on a surface at one end of the base portion 1213, and the hook portion 1212 projects from one side surface of the anchor portion 1211 toward a center of the base portion 1213, forming an insertion groove 1216 at the lower portion of the hook portion 1212, that is, between the hook portion and the base portion 1213. The width of the hook portion 1212 may be narrower than the width of the side surface of the anchor portion 1211.

The base portion 1213 of the insulation case 1210 is made of an insulation material and may be a resin molded article that is manufactured through an injection process. The base portion 1213 may be formed as planar plate and one surface of the base portion 1213 may contact an outer surface of the cap plate 1120. The protection device 1400 may be located and connected to the other surface of the base portion 1213. The base portion 1213 and cap plate 1120 may be combined with each other by an insulating adhesive, such as, for example, a insulating double sided tape. In addition, the protection device 1400 is attached to the first lead, 1220, which is mechanically inserted into the insertion groove 1216.

The side wall 1214 of the insulation case 1210 is formed perpendicular to the base portion 1213, and a pair of opposing side walls 1214 are formed on long side edges of the base portion 1213.

The electrode terminal 1130 of the bare cell 1100 extends through the through hole 1215. The electrode terminal 1130 is electrically coupled to an upper region 1230*a* of the second lead 1230. The through hole 1215 may be formed between the opposing side walls 1214.

The insertion groove 1216 of the insulation case 1213 comprises a space between the upper surface of the base portion 1213 and the lower surface of the hook portion 1212. The lower surface of the hook portion 1212 is planar. Thus, the lower surface of the hook portion 1212 and the upper surface of the base portion 1213 together provide the insertion groove 1216. As shown in FIGS. 3 and 4, an insertion portion 1221 of the first lead 1220 is inserted into the insertion groove 1216, thereby preventing the protection device 1400, which is attached to the first lead 1220, from being moved in vertical direction from the upper surface of the base portion 1213.

Referring to FIG. 2, an indention 1217 may be formed on the upper surface of the anchor portion 1211 to prevent shrinkage of the anchor portion 1211 during the injection molding of the anchor portion 1211.

The anchor portion 1211, hook portion 1212 and base portion 1213 may be a single integrally molded insulating resin article.

The first lead 1220 includes the insertion portion 1221, which inserts into the insertion groove 1216 of the insulation case 1213, a welding portion 1222 and a vertical portion 1224. The vertical portion 1224 is bent in the direction perpendicular to the insertion portion 1221 and welding portion 1222. In addition, the insertion portion 1221 and welding portion 1222 are formed to have a step height 1223 so that the welding portion 1222 is formed to be higher than the insertion portion 1221. The welding portion 1222 of the first lead 1220 may be electrically coupled to a first terminal 1401 of the protection device 1400 to be described later. The surface area of the welding portion 1222 may be the same or larger than that of the first terminal 1401. As shown in FIGS. 3 and 4, the insertion portion 1221 is mechanically inserted into the insertion groove 1216 of the insulation case 1210. The insertion portion 1221 has a thickness corresponding to the height of the insertion groove 1216 so that the insertion portion may be smoothly inserted in the insertion groove 1216. As non-limiting examples, the first lead 1220 may be made of conductive nickel or nickel alloy.

The second lead 1230 is divided into the upper region 1230*a* and lower region 1230*b*. The upper region 1230*a* has a step height so as to be higher than the lower region 1230*b*. The lower region 1230*b* of the second lead 1230 is electrically coupled to a second terminal 1402 of the protection device 1400. The upper region 1230*a* of the second lead 1230 is electrically coupled to the electrode terminal 1130 of the bare cell 1100 through the through hole 1215. The surface area of the lower region 1230*b* may be the same or larger than that of the second terminal 1402. The second lead 1230 may be formed as an elongated thin flat plate, and, as non-limiting examples, may be made of conductive nickel or nickel alloy.

The third lead 1300 may be attached to the upper surface of the cap plate 1120 of the bare cell 1100. The third lead 1300 includes a vertical portion 1301 formed in the direction perpendicular to the cap plate 1120. The third lead 1300 is electrically coupled to a second internal connection terminal 1502 of a protection circuit board 1500 by the vertical portion 1301. The height of the vertical portion 1301 may be the same as the height of the vertical portion 1224 of the first lead 1220. As non-limiting examples, the third lead 1300 may be made of conductive nickel or nickel alloy.

The protection device 1400 is provided on the base portion 1213. The protection device 1400 may include the first terminal 1401 and second terminal 1402 at opposite side surfaces thereof. The first terminal 1401 is electrically coupled to the welding portion 1222 of the first lead 1220 and the second terminal 1402 is electrically coupled to the lower region 1230*b* of the second lead 1230. The protection device 1400 prevents combustion or explosion of the battery by interrupting the current when the temperature of the bare cell of the battery increases or when the voltage is increased by overcharging. As non-limiting examples, a thermal breaker, a bimetal or a PTC device may be used as the protection device.

The protection circuit board 1500 may be formed of a circuit that provides a uniform charge state by controlling the charging/discharging of the battery and a circuit preventing overdischarging/overcharging. The first and second internal connection terminals 1501 and 1502 are provided on the lower surface of the protection circuit board 1500.

The electrical coupling relationship between the protection circuit board 1500 and bare cell 1100 is as follows. The electrode terminal 1130 of the bare cell 1100 is exposed through the through hole 1215 of the insulation case 1210 and is electrically coupled to the upper region 1230a of the second lead 1230, and the lower region 1230b of the second lead 1230 is electrically coupled to the second terminal 1402 of the protection device 1400. The first terminal 1401 of the protection device 1400 is electrically coupled to the upper surface of the welding portion 1222 of the first lead 1220 by welding, and the first internal connection terminal 1501 of the protection circuit board 1500 is electrically coupled to the vertical portion 1224 of the first lead 1220. Accordingly, the protection circuit board 1500 is electrically coupled to the electrode terminal 1130 of the bare cell 1100 through the first lead 1220, the protection device 1400 and the second lead 1230. Moreover, the third lead 1300 electrically couples the cathode terminal of the bare cell 1100 with the second internal connection terminal 1502 of the protection circuit board 1500. In other words, the cap plate 1120 of the bare cell 1100 is electrically coupled to the second internal connection terminal 1502 of the protection circuit board 1500 through the third lead 1300.

FIG. 5 is a perspective view illustrating the relationship of a hook portion 2212 of an insulation case 2210 and a first lead 1220 of a secondary battery 2000 according to another embodiment of the present invention and FIG. 6 is a sectional view illustrating the secondary battery of FIG. 5 as assembled.

The hook portion 2212 has a different shape from the hook portion of the secondary battery described above. It is to be understood that other parts of the secondary battery 2000 may be the same as what is described above. In particular, the same reference numerals are used for elements that are the same in this embodiment as in the embodiment described above.

Referring to FIGS. 5 and 6, the hook portion 2212 of the insulation case 2210 has the same width as one side surface of an anchor portion 2210. In other words, the hook portion 2212 is formed by extending the anchor portion 2211, except for the region of the insertion groove 2216. As described above, the width of the insertion groove 2216 formed between the hook portion 2212 and base portion 1213 can be widened by making the hook portion 2212 wider. Thus, the insertion portion 1221 of the first lead 1220 can be smoothly inserted into the insertion groove 2216, and the bond strength between the first lead 1220 and insulation case 2210 can be improved. Thus, the protection device 1400 (see FIG. 1) welded to the welding portion 1222 of the first lead 1220 through the first terminal 1401 (see FIG. 1) can be strongly held to the insulation case 2210.

FIG. 7 is a perspective view illustrating the relationship of a hook portion 3212 of an insulation case 3210 and a first lead 1220 of the secondary battery 3000 according to another embodiment of the present invention, and FIG. 8 is a sectional view illustrating the secondary battery of FIG. 7 as assembled.

A hook portion 3212 of the insulation case 3210 of the secondary battery 3000 has a different shape from the hook portion of the secondary batteries described above. It is to be understood that other parts of the secondary battery 2000 may be the same as what is described above. In particular, the same reference numerals are used for elements that are the same in this embodiment as in the embodiment described above.

Referring to FIGS. 7 and 8, support side walls 3212a are formed on opposing sides of the lower side surface of the hook portion 3212 to contact the upper surface of the base portion 1213. The lower surface of the hook portion 3212 is spaced from the upper surface of the base portion 1213 such that the lower surface and side walls 3212a of the hook portion and the base portion form a rectangular insertion groove 3216.

In other words, differently from the hook portion 2212 (See FIG. 5) of the embodiment shown in FIG. 5, both side surfaces of the hook portion 3212 extend toward the base portion 1213 and contact to the base portion 1213, thereby forming the support side walls 3212a. An insertion portion 3221 of the first lead 3220 has a size and shape that corresponds to the size and shape of the insertion groove 3216 such that the insertion portion 3221 of the first lead 3220 may be easily inserted into the rectangular insertion groove 3216. The thickness of the insertion portion 3221 may correspond to a height of the insertion groove 3216, and a width of the insertion portion 3221 may correspond to a width of the insertion groove 3216. Thus, the insertion portion 3221 of the first lead 3220 can be smoothly inserted into the insertion groove 3216. Thus, the protection device 1400, which is welded to the welding portion 3222 of the first lead 3220 through the first terminal 1401, can be strongly affixed to the insulation case 3210 (see FIG. 1).

The first lead 3220 includes a horizontal portion and a vertical portion 3224. The horizontal portion includes the insertion portion 3221 and the welding portion 3222 formed with a step height from the insertion portion 3221. The vertical portion 3224 is bent in the direction perpendicular to the welding portion 3222. Therefore, according to the embodiment of FIGS. 7 and 8, the inserted portion 3221 of the first lead 3220 is prevented from being moved in the vertical direction as well as in the horizontal direction, thereby enhancing the bond strength between the first lead 3220 and the insulation case 3210.

FIG. 9 is a perspective view illustrating the relationship of portions of the insulation case 4210 and the first lead 4220 of the secondary battery 4000, FIG. 10 is a sectional view illustrating the secondary battery of FIG. 9 as assembled and FIG. 11 is a plan view illustrating the secondary battery of FIG. 9 as assembled.

In the insulation case 4210 of the secondary battery 4000, a base portion indentation 4213a is formed on an upper surface of a base portion 4213 juxtaposed to a hook portion 1212. It is to be understood that other parts of the secondary battery 2000 may be the same as what is described above. In particular, the same reference numerals are used for elements that are the same in this embodiment as in the embodiment described above.

Referring to FIGS. 9, 10 and 11, a projection portion 4221a corresponding to the base portion indentation 4213a is formed on a lower surface of an insertion portion 4221 of a first lead 4220. When the insertion portion 4221 is inserted into an insertion groove 4216 of the insulation case 4210, the projection portion 4221a is inserted into the base portion indentation 4213a. In other words, the insertion portion 4221 of the first lead 4220 combines with the insertion groove 4216 by insertion, and simultaneously, the projection portion 4221a inserts into the base portion indentation 4213a, thereby preventing the inserted first lead 3220 from being moved in the vertical direction as well as in the horizontal direction. Thus, the protection device 1400, which is welded to the welding portion 1222 of the first lead 4220 through the first terminal 1401, can be strongly affixed to the insulation case 4210 (see FIG. 1). The sectional surface of the base portion indentation 4213a may be any shape such as, for example, circular, oval or rounded rectangular. The projection portion 4221a may be formed to correspond to the shape of the base portion indentation 4213a.

The thickness of the insertion portion 4221 of the first lead 4220 may correspond to a height of the insertion groove 4216 such that the insertion portion 4221 of the first lead 4220 may be strongly inserted into the insertion groove 4216.

FIG. 12 is a perspective view illustrating the relationship of a projection portion 5212 of an insulation case 5210 and a first lead 5220 of the secondary battery 5000 according to another embodiment, FIG. 13 is a sectional view illustrating the secondary battery of FIG. 12 as assembled and FIG. 14 is a plan view of the secondary battery of FIG. 12 as assembled.

The insulation case 5210 includes a base portion 1213, an anchor portion 1211 provided on a surface at one end of the base portion 1213 and a projection portion 5212 that projects toward a center of the base portion 1213 from one side surface of the anchor portion 1211. The projection portion 5212 includes a first projection portion 5212a that extends from an upper surface of the projection portion 5212 and a second projection portion 5212b under the first projection portion 5212a with a step height from the first projection portion 5212a.

A first lead 5220 includes a horizontal portion and a vertical portion 1224 bent in the direction perpendicular to the horizontal portion. The horizontal portion includes an insertion portion 5221, a welding portion 1222 formed to have a step height from the insertion portion 5221. A thickness t2 (see FIG. 13) of the insertion portion 5221 of the first lead 5220 corresponds to a height t1 (see FIG. 13) of the second projection portion 5212b. An insertion groove 5221a corresponding to the projected height of the second projection portion 5212b is formed in the insertion portion 5221. The insertion groove 5221a combines with the second projection portion 5212b by insertion so as to surround the second projection portion 5212b.

Therefore, the first lead 5220 is prevented from being moved in the vertical direction as well as in the horizontal direction. Thus, the protection device 1400 (see FIG. 1) welded to the welding portion 1222 of the first lead 5220 through the first terminal 1401 (see FIG. 1) can be strongly affixed to the insulation case 5210.

The term "lead engaging portion" may be used to refer generally to the structures of the insulation case, such as the anchor portion and hook portion in the various embodiments, which engage the lead (1220, 3220, 4220 or 5220) to immobilize the protection device 1440 on the base portion 1213 of the insulation case 1210 in at least one direction.

As described above, the secondary battery according to aspects of the present invention produces the following effects. Separation of the protection device of the secondary battery from the insulation case can be prevented by fixing the protection device to the insertion groove located in the insulation case by way of the first lead. Defects can be reduced and productivity in manufacturing the secondary battery can be improved by providing a connection between the protection device and the insulation case using an assembling type connection method that does not require using double sided tape. The durability of the connection portion between the protection device and the insulation case of the secondary battery and the resistance to external forces such as torsion or bending can be improved.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   a bare cell;
   an insulation case located on the bare cell;
   a protection device seated on the insulation case and electrically coupled to the bare cell; and
   a first lead electrically coupled to a first terminal of the protection device, wherein the insulation case comprises;
   a base portion on which the protection device is seated;
   an anchor portion provided on a surface at one end of the base portion; and
   a hook portion projecting from one side surface of the anchor portion toward a center of the base portion, wherein an insertion groove defined between the base portion and a lower surface of the hook portion, and
   wherein at least part of the first lead is inserted into the insertion groove such that the at least part of the first lead is interposed between the hook portion and the base portion, and such that the at least part of the first lead is connected to the insulation case, wherein the protection device comprises a protection circuit board, and wherein the insulation case including the base portion, the anchor portion and the hook portion is an integrally molded resin article.

2. The secondary battery of claim 1, wherein the width of the hook portion is narrower than the width of the one side surface of the anchor portion.

3. The secondary battery of claim 1, wherein the width of the hook portion is the same as the width of the one side surface of the anchor portion.

4. The secondary battery of claim 3, wherein support side walls extend from opposing lower side surfaces of the hook portion and contact an upper surface of the base portion such that a rectangular insertion groove is formed between the lower surface of the hook portion and the upper surface of the base portion.

5. The secondary battery of claim 4, wherein the insertion part of the first lead is inserted into the insertion groove, and the thickness and width of the insertion portion respectively correspond to the height and width of the insertion groove.

6. The secondary battery of claim 1, wherein a base portion indentation is formed in a region of the base portion juxtaposed to the hook portion, and a projecting portion corresponding to the base indentation is formed on a lower surface of the first lead.

7. The secondary battery of claim 6, wherein a sectional surface of the base indentation has a circular, oval or round rectangular shape.

8. A secondary battery, comprising:
   a bare cell;
   an insulation case located on the bare cell;
   a protection device seated on the insulation case and electrically coupled to the bare cell; and
   a first lead electrically coupled to a first terminal of the protection device, wherein the insulation case comprises:
   a base portion on which the protection device is seated;

an anchor portion provided on a surface at one end of the base portion; and a hook portion projecting from one side surface of the anchor portion toward a center of the base portion and having an insertion groove at a lower portion thereof, and wherein the first lead is connected to the hook portion of the insulation case, and wherein the first lead comprises a horizontal portion and a vertical portion bent in the direction perpendicular to the horizontal portion, and the horizontal portion comprises a welding portion electrically coupled to the first terminal of the protection device and an insertion portion that is inserted into the insertion groove of the insulation case.

9. The secondary battery of claim 8, wherein a step height is formed between the welding portion and the insertion portion of the first lead.

10. The secondary battery of claim 8, wherein height of the insertion groove corresponds to a thickness of the insertion portion of the first lead.

11. A secondary battery, comprising:
a bare cell;
an insulation case located on the bare cell;
a protection device seated on the insulation case; and
a first lead electrically coupled to a first terminal of the protection device; wherein the insulation case comprises:
  a base portion on which the protection device is seated;
  an anchor portion provided on a surface at one end of the base portion; and
  a projection portion that projects from one side surface of the anchor portion toward a center of the base portion, wherein the projection portion comprises a first portion extending from an upper surface of the projection portion and a second portion formed under the first portion so as to have a step height with the first projection portion, and
wherein at least part of the first lead is inserted between the first and second portions of the projection portion such that the at least part of the first lead is connected to the insulation case, wherein the protection device comprises a protection circuit board, and wherein the insulation case including the base portion, the anchor portion and the projection portion is an integrally molded resin article.

12. A secondary battery, comprising:
a bare cell;
an insulation case located on the bare cell;
a protection device seated on the insulation case; and
a first lead electrically coupled to a first terminal of the protection device, wherein the insulation case comprises:
  a base portion on which the protection device is seated;
  an anchor portion provided on a surface at one end of the base portion; and
  a projection portion that projects from one side surface of the anchor portion toward a center of the base portion, wherein the projection portion comprises a first projection portion extending from an upper surface of the projection portion and a second projection portion formed under the first projection portion so as to have a step height with the first projection portion, and
wherein the first lead is connected to the projection portion of the insulation case, and wherein the first lead comprises a horizontal portion and a vertical portion bent in a direction perpendicular to the horizontal portion, and the horizontal portion includes a welding portion electrically coupled to the first terminal of the protection device and an insertion portion inserted into the insertion groove of the insulation case.

13. The secondary battery of claim 12, wherein a thickness of the insertion portion of the first lead corresponds to a height of the second projection portion, and an insertion groove corresponding to a height of the second projection portion is formed at the insertion portion of the first lead, and the second projection portion is inserted into and surrounded by the insertion groove.

14. A secondary battery, comprising:
a bare cell;
an insulation case located on the bare cell;
a protection device seated on the insulation case and electrically coupled to the bare cell; and
a first lead physically and electrically coupled to a first terminal of the protection device, wherein the insulation case comprises;
  a base portion on which the protection device is seated; and
  a lead-engaging portion placed over the base portion and defining an insertion space between the base portion and a surface of the lead-engaging portion,
wherein the first lead is inserted into the insertion space such that the protection device is immobilized in at least one direction on the base portion, wherein the protection device comprises a protection circuit board, and wherein the insulation case including the base portion and the lead-engaging portion is an integrally molded resin article.

15. The secondary battery of claim 14, wherein the lead-engaging portion engages the first lead such that the protection device is prevented from separating from the base portion in a vertical direction.

16. The secondary battery of claim 14, wherein the lead-engaging portion engages the first lead such that the protection device is prevented from separating from the base portion in a vertical direction and from moving in a width direction of the base portion.

* * * * *

UNITED STATES PATENT AND TRADEMARK OFFICE
CERTIFICATE OF CORRECTION

PATENT NO. : 8,178,236 B2  
APPLICATION NO. : 12/263600  
DATED : May 15, 2012  
INVENTOR(S) : Sunjae Kim Page 1 of 1

It is certified that error appears in the above-identified patent and that said Letters Patent is hereby corrected as shown below:

Cover Page: Item 30, insert -- Foreign Application Priority Data
               Nov. 15, 2007 (KR)..............2007-116478 --.

At column 10, line 65-66, please delete "comprises.", and insert -- comprises, --, therefor.

At column 11, line 26, please delete "device;", and insert -- device, --, therefor.

At column 11, line 26-27, please delete "comprises:", and insert -- comprises; --, therefor.

At column 11, line 51-52, please delete "comprises:", and insert -- comprises; --, therefor.

Signed and Sealed this
Twenty-fifth Day of September, 2012

David J. Kappos
*Director of the United States Patent and Trademark Office*